US006813845B2

(12) United States Patent
Jordil et al.

(10) Patent No.: US 6,813,845 B2
(45) Date of Patent: Nov. 9, 2004

(54) DIMENSION-MEASURING COLUMN AND METHOD FOR ENTERING A COMMAND TO SWITCH THE MEASURE MODE IN SUCH A COLUMN

(75) Inventors: Pascal Jordil, Ecoteaux (CH); Claude Rouge, Prangins (CH); Charles-Henri Zufferey, Erde (CH)

(73) Assignee: Tesa SA, Renens (CH)

( * ) Notice: Subject to any disclaimer, the term of this patent is extended or adjusted under 35 U.S.C. 154(b) by 4 days.

(21) Appl. No.: 10/314,609

(22) Filed: Dec. 9, 2002

(65) Prior Publication Data

US 2003/0106232 A1 Jun. 12, 2003

(30) Foreign Application Priority Data

Dec. 12, 2001 (EP) ............................................. 01811221

(51) Int. Cl.$^7$ ................................................. G01B 5/00
(52) U.S. Cl. ......................................................... 33/833
(58) Field of Search .................................. 33/832, 833

(56) References Cited

U.S. PATENT DOCUMENTS 3,895,356 A    7/1975   Kraus
4,679,326 A  * 7/1987   Takizawa et al. ............. 33/832
6,401,352 B1 * 6/2002   Kimura et al. ................ 33/832
6,446,351 B1 * 9/2002   Zhang et al. .................. 33/832

FOREIGN PATENT DOCUMENTS

EP       0 780 662 A2    6/1997
EP       0 780 662 A3    3/1999
JP       03035960        2/1991

* cited by examiner

Primary Examiner—Christopher W. Fulton
(74) Attorney, Agent, or Firm—Pearne & Gordon LLP

(57) ABSTRACT

Method enabling a command to switch the measure mode to be entered in a dimension-measuring column (1) provided with a probe tip (44). The command is entered by acting on the angular position of a turning control button, for example by pivoting it until a predetermined angular position. A tactile reaction is perceived by the operator when a predetermined threshold is reached.

Advantages: it is possible to enter the commands to switch measuring mode intuitively and without the hands letting go of the turning button.

33 Claims, 3 Drawing Sheets

DIMENSION-MEASURING COLUMN AND METHOD FOR ENTERING A COMMAND TO SWITCH THE MEASURE MODE IN SUCH A COLUMN

This application claims priority of European Patent Application EP01811221.9, the content of which is hereby incorporated.

FIELD OF THE INVENTION

The present invention concerns a dimension-measuring column, notably a single vertical axis column, as well as a method for entering commands to switch the measure mode in such a column.

RELATED ART

Columns for measuring vertical dimensions are frequently used in mechanical workshops or in industry for measuring different vertical coordinates of a work-piece. An example of measuring column 1 is represented diagrammatically in FIG. 1. The shown column comprises a probe tip 44 mounted on a measuring carriage 3 and brought into contact with the piece to be measured 9 as well as a vertical displacement mechanism (not represented) allowing this probe tip to be displaced along the vertical axis z. The vertical displacement mechanism can be manual or motorized according to the model. A measuring and displaying system 7 enables the vertical position of the probe tip to be determined and displayed on a display 70. The system 7 also allows the pressing force of the probe tip against the work-piece 9 to be measured. The measuring system uses for example a capacitive, inductive, magneto-resistive or optical sensor comprising for example a scale against the supporting frame 2 and a sensor in the carriage 3.

Usual measuring columns have a supporting frame 2 of a height comprised between 50 centimeters and 2 meters and allow the vertical position of the probe tip 44 to be measured with an accuracy on the order of the micron. The piece to be measured 9 is placed close to the measuring column 1 and the probe tip is displaced vertically so as to rest against the portion of the work-piece whose vertical coordinate one wishes to measure. The measuring column 1 can be mounted on an air-cushion base 20 that facilitates its horizontal displacement. Such measuring columns are described for example in the documents U.S. Pat. No. 4,924,598. Such measuring columns are further commercialized by the applicant under the name MICRO-HITE (registered trademark) and TESA-HITE (registered trademark) for example.

Current measuring columns are often provided with a control panel 7 comprising control keys 71 for entering different commands. The control panel includes a microprocessor capable of executing a computer program for commanding the displacements of the carriage 3, the measuring and the displaying of the results. The commands that can be entered by means of the control panel 7 are interpreted by a microprocessor that executes a computer program for commanding the displacements of the carriage 3, the measuring and the displaying of the results. The entered commands allow for example to displace the measuring carriage, to display the absolute height of a point or the difference between two measuring points. Other commands enable the measure mode or display mode to be switched. Different examples of useful measure modes are described in the patent U.S. Pat. No. 3,895,356. One useful measure mode that is sometimes encountered allows the turn-back points to be measured, i.e. the lowest and the highest point of a hole or rod, and the height difference between these two extremes to be calculated. The available display modes make is possible for example to chose between metric or imperial units or to display the probe tip's pressing force rather than its position.

The handling of the control keys 71 on a control panel is not very intuitive; the number of buttons is considerable when many measure and display modes are available. The operator's eyes must leave the piece to be measured in order to select the button to actuate. Furthermore, it is necessary to let go of the piece 9 or of the measuring column 1 to enter a command to switch the measure mode.

Columns are also known that are provided with a turning control button (crank) 8 that allows the vertical displacements of the probe tip 44 to be controlled. The control button 8 can easily be used without having to be watched. Its diameter and position are chosen so as to allow a good hold on the measuring column 1 with a single hand on the button 8. The commands that can be entered with this button are however restricted to vertical displacements of the measuring carriage.

Measuring columns are also known that are provided with a command wheel (not represented) close to the turning control button 8 and allowing commands to activate the turn-back point search mode. In this mode, the piece to be measured 9 or the measuring column 1 is then displaced horizontally, whilst maintaining the resting pressure between the probe tip 44 and the work-piece, so as to scan the area close to the extrema by overshooting at least once the turn-back point. An extreme-computing algorithm determines the vertical coordinate of the turn-back point; an acoustical and/or optical signal confirms that the point's vertical coordinate has been calculated. The operator must then actuate the command wheel to deselect the automatic turn-back point search mode, then displace the probe tip to perform a new measurement. This measure mode is very useful for measuring the diameter of a hole or of a rod, for example.

These systems have the inconvenience of requiring an additional command wheel which increases the cost of the system and whose use is not very intuitive. Furthermore, it is necessary to let go for a while of the turning control button 8 to actuate the control wheel.

It is thus an aim of the present invention to propose a method for entering commands to switch the measure mode in a column for measuring vertical dimensions that avoids the inconveniences of the prior art methods, as well as a measuring column that is improved and easier to use than the measuring columns of the prior art.

According to the invention, these aims are achieved by means of a method and of a measuring column having the characteristics of the corresponding independent claims, variants of preferred embodiments being moreover described in the dependent claims.

In particular, these aims are achieved by means of a method enabling a command to switch the measure mode to be entered in a dimension-measuring column, wherein this mode-switch command is entered only by acting on the angular position of a turning control button.

This method has the advantage that the mode switch is effected by moving the turning control button towards a predetermined angular position, different from the angular position range used for vertically displacing the probe tip. The mode-switch commands can thus be entered without it being necessary to let go of the turning button.

The The dimension-measuring column of the invention can function according to a limited and discrete number of different measure modes that can be selected by means of one of the turning control buttons. Each measure mode can furthermore call for continuous or quasi-continuous parameters that depend for example on the angular position of the turning control button between two predetermined thresholds.

The turning control button used is preferably constituted by the crank allowing the probe tip to be displaced vertically. The invention thus notably consists in using this crank not only for vertically displacing the probe tip but also for entering commands to switch the measure mode.

The command to switch the measure mode is effected preferably each time the turning control button passes through one or several predetermined angular positions. Thus, whatever the vertical position of the carriage, a command to switch the measure mode can be entered by bringing the turning control button exactly in the same angular position. This way of functioning has the advantage of being very intuitive.

In a preferred embodiment of the invention, a tactile reaction, for example a sudden change of the rotation torque, is perceived by the operator when the control button passes through the predetermined position causing a mode switch. In this manner, a command to switch the measure mode can be entered without the eyes leaving the piece to be measured or the screen displaying the results.

In a preferred embodiment of the invention, different mode-switch commands can be entered by having the turning control button pass twice through the same angular position during a time interval of limited duration. It is thus possible to increase the number of different commands that can be entered.

The invention will be better understood with the aid of the description of an embodiment, given by way of example and illustrated by the attached drawings containing the figures, in which:

FIG. 1, already described, shows a diagrammatic view of a measuring column to which the invention is applicable.

Figure 1:
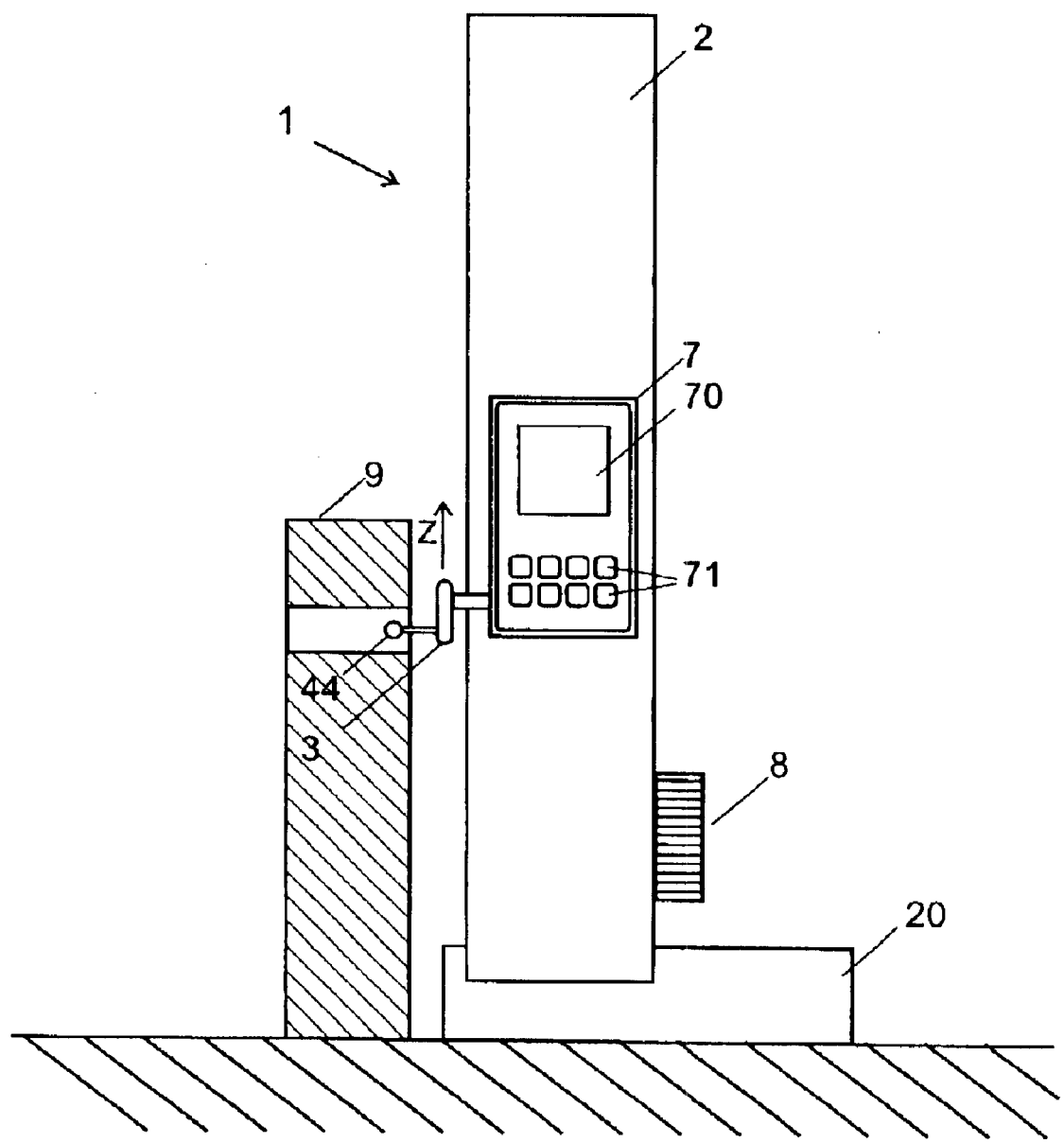
Figure 2:
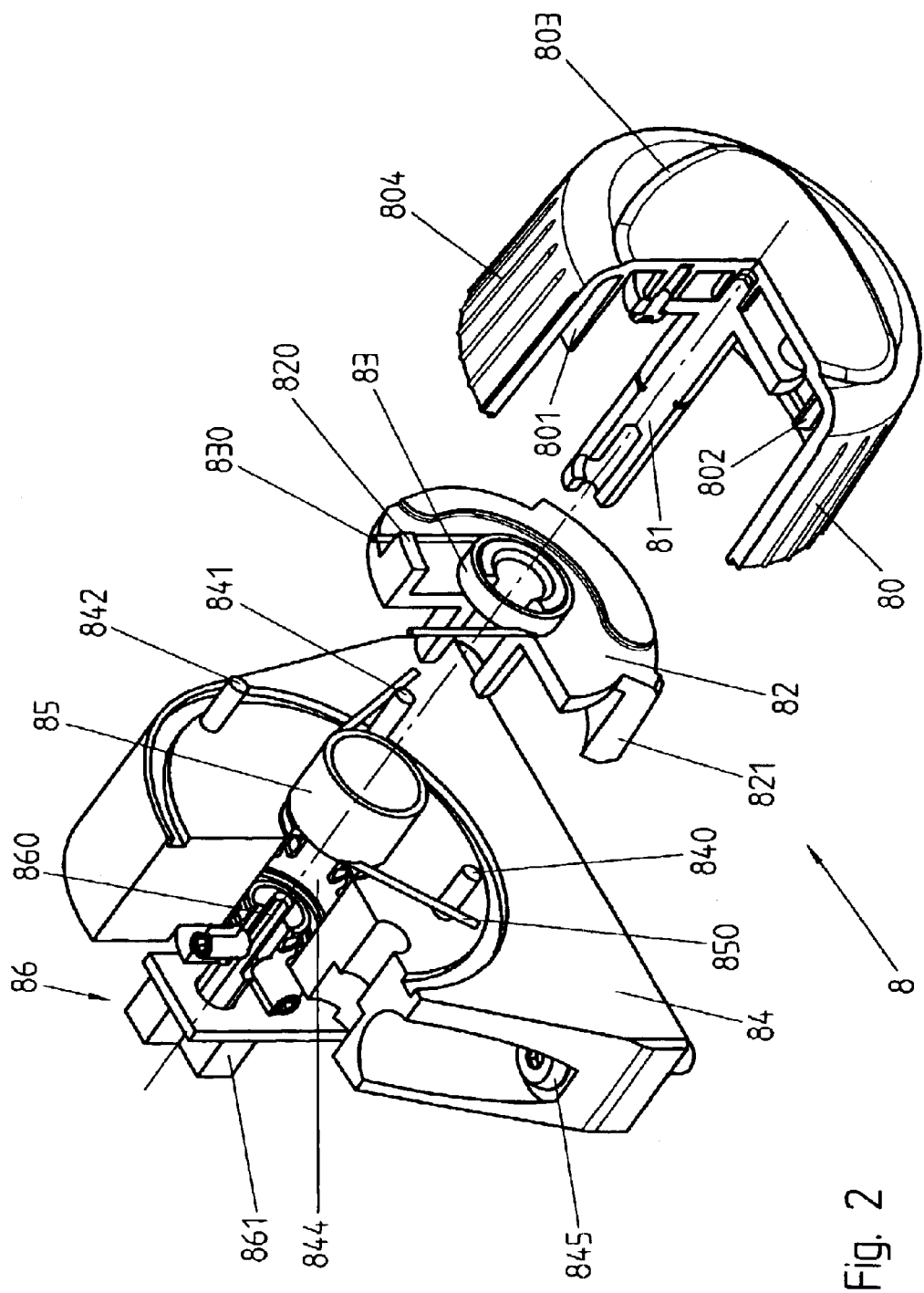
FIG. 2 shows an exploded view of a turning control button according to the invention.

The invention is applicable to measuring columns having one or several axes, manual or preferably motorized, for example to single vertical axis measuring columns of the type illustrated in FIG. 1 and described here above. The measuring column 1 preferably comprises both a turning control button 8 and a control panel 7. The turning control button 8 enables the carriage 3 to be displaced vertically and, as will be seen, to enter commands to switch measure modes. The control panel 7 comprises a display 70, for example a liquid crystal or plasma display, as well as several control keys 71. The control panel 7 can also comprise other data entering means, for example a mouse, a joystick a microphone etc., and other reproducing means, for example a loudspeaker, a printer, a serial interface, for example of the type RS232, infrared or radio, etc. It is also possible to connect the control panel 7 with a computer or within a network.

The display 70 enables the measurement result to be displayed, for example the absolute vertical position of the probe tip, the difference between two positions, a diameter etc., according to the selected measure mode. The selected measure mode is preferably also displayed, for example by means of icons. It is also possible to use this display to represent the pressing force of the probe tip 44 against the piece to be measured 9.

The control panel 7 further comprises control keys 71, including programmable function keys and keys having a predefined function, for example an on-off button, a print key, etc.

The measuring system can function according to several distinct measure modes, for example:

displacement of the probe tip with continuous display of the probe tip's position, automatic displacement of the probe tip until it comes into contact with the piece to be measured, then measuring and displaying of the contact point's coordinate, search of the turn-back points for measuring inner or outer diameters, measurement of perpendicularity divergences or of deviations from the straight line, measurement along different axes, absolute measurement or measurement of the difference relative to a previous measuring point, etc.

Certain measure modes can further be combined.

All these measure modes can preferably be selected by means of the control panel 7. According to the invention, at least one sub-set of frequently used measure modes can furthermore be selected faster and more intuitively by acting on the angular position of the turning control button 8.

The structure and functioning of the turning measuring button 8 will now be described in relation to FIGS. 2 to 5. This button is preferably mounted on the base 20 or close to the bottom of the supporting frame 2. It is thus possible to firmly hold the measuring column 1 by simply holding it by this button whose diameter, for example between 4 and 12centimeters, is sufficient to fill the palm of the hand. During use, one hand can thus hold the piece to be measured 9 whereas the operator's other hand holds the measuring column by this control button 8. It is not necessary to let go of the control button to enter the most commonly used commands to switch the measure mode. It would however also be possible to place the turning control button elsewhere, for example directly on the control panel 7.

The preferred embodiment of the control button 8 represented comprises an outer crank 80 made for example of injected synthetic material. The outer surface of the crank is provided with flutings 804 to prevent it from slipping in the hand. A motif 803 on the front side of the crank 80 allows it to indicate approximately its angular position. The crank 80 is integral with an axial rod 81 traversing the other elements of the control button and driven in rotation with the crank. In the represented example, the rod 81 is screwed on the crank 80; is would also be possible to inject these two elements in a single piece, at the price of an injection mould harder to make. The crank 80 is hollow and thus hides the other elements 81, 82 in its inside volume when the button is assembled.

The inner lateral surface of the crank 80 is provided with a stop 801 that drives a first spring 83, as will be seen further below. The driving stop 801 is constituted by a protruding angular portion covering an angular segment of about 20° spread symmetrically around the zenith, i.e. the highest point of the crank 80 in the resting position illustrated in FIG. 3. In the following section of the description, this zenith point will be used as reference point 0° for indicating the angular position of other elements of the control button 8. The inner lateral surface of the crank 80 is provided with a second stop 802 (visible in FIGS. 3 to 5) at 180°.

An intermediate driving piece 82 constituted of an approximately circular disc is attached to the rod 81 with sufficiently play to swivel freely around this rod. The side of the intermediate driving piece 82 turned towards the crank 80 is provided with a protruding retention stop 820 covering an angular segment more or less equal to that covered by the driving stop 801. In resting position, this stop 820 is centered at 0°.

The other side of the intermediate driving piece 82 is provided with a protruding driving stop 821. In the example represented, this stop is centered in resting position at 180° and has a Π shape visible in particular in FIGS. 3 to 5. The outer sides 8210 of the legs of the driving stop 821 enable a second spring 85 to be driven, as will be seen further below. The inner sides 8211 work with the second stop 802 to restrict the angular displacement of the crank 80 relative to the intermediate driving piece 82.

The springs 83 and 85 are both constituted of a steel wire wound several times around the central rod 81 and work in this example through unwinding. The torque required for unwinding the second spring 85 is however clearly greater than the unwinding torque of the spring 83. In resting position, the distance between the two free ends 830 of the first spring 83 is determined by the stops 801 and 820, which must have the same length in order to avoid any play at the resting point, whereas the distance between the free ends 850 of the second spring 85 is determined by the driving stop 821.

The turning control button 8 further comprises a plate 84 fastened to the base 20 or to the supporting frame 2 by means of screws 845. The plate 84 is provided with an opening 844 in which the rod 81 can pivot freely. The side of the plate turned towards the crank 80 and towards the intermediate piece 82 comprises two retention stops of the second spring 85 constituted in this example by two columns 840 and 841 placed symmetrically around the point 180°, the angular distance between the two columns 840 and 841 corresponding more or less to the angular segment occupied by the driving stop 821. The plate 84 further comprises two stops 842 placed in this example at about −45° and +45° and designed, as will be seen further below, to restrict the rotation of the second spring 85.

The one skilled in the art will understand that the button described here above and illustrated in the Figures constitutes only one possible embodiment and that other constructions can be conceived for realizing a turning control button exerting a reaction force varying with perceptible thresholds.

The turning control button 8 also comprises a potentiometer 86 whose axle 860 is firmly fastened to the rod 81 and whose body is, similarly to the plate 84, integral with the base 20 or the supporting frame 2. The resistance value between the potentiometer's outer terminals depends on the angular position of the axle 860 and thus of the rod 81 and of the crank 80. An electronic circuit (not represented) enables the value of this resistance to be converted into a voltage or a converted current into a digital signal and transmitted to the control panel 7. A computer program executed by a microprocessor in this control panel interprets the digital value of the voltage/of the current to control the displacements of the probe tip 44 or for entering the commands to switch the measure mode. The signal supplied to the computer program thus depends only on the angular position of the crank 80.

Figure 3:
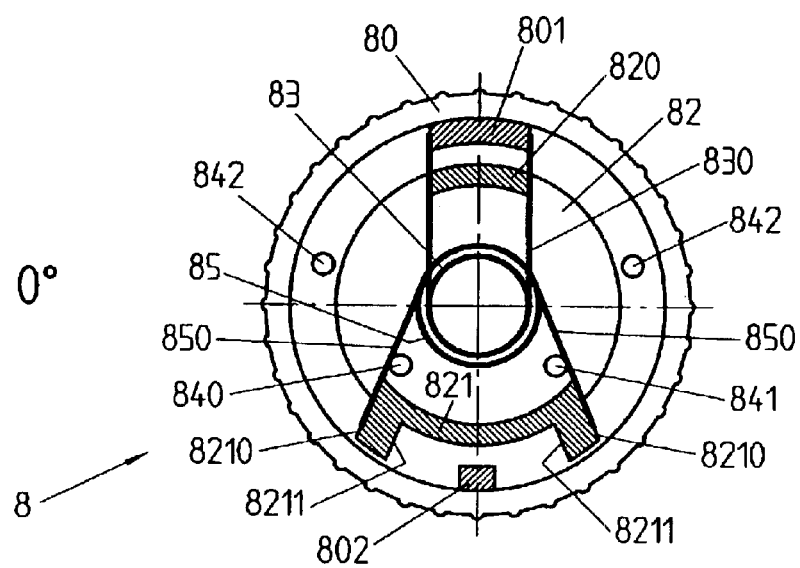
FIG. 3 shows a diagrammatic view of the main elements of the turning control button in resting position.

The functioning of the turning control button 8 will now be described with the aid of FIGS. 3 to 5. In FIG. 3, the turning control button is in resting position. The fixed stops 840 and 841 prevent the two ends 850 of the second spring 85 to pivot simultaneously in the same direction. The counter-winding force of the second spring tends to move these two ends 850 closer to one another, which brings the stop 821 to 180°. The intermediate piece 82 is thus in resting position in the position illustrated in FIG. 3, with the first stop 820 centered at 0°. This stop 820 also drives the first spring 83 in vertical position; the counter-winding force of this spring 83 brings the crank's stop 801 to 0°. In resting position, when no outer force is exerted on the crank 80, the later is thus brought back through the joint action of the two springs 83 and 85 in the position illustrated in FIG. 3 with the driving stop 801 centered at 0°.

Figure 4:
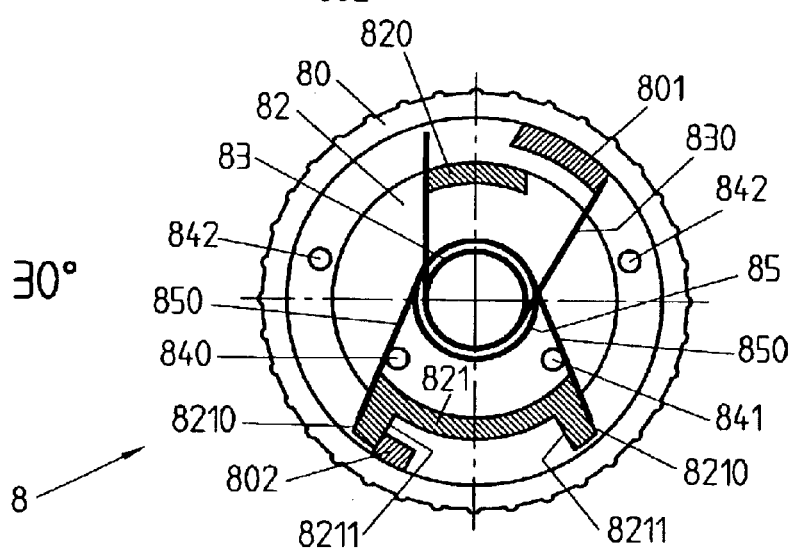
FIG. 4 shows a diagrammatic view of the main elements of the turning control button in the first predetermined angular position causing a switch of the measure mode.

When the operator turns the crank 80 for example in the clockwise direction illustrated in FIG. 4, the driving stop 801 moves one of the ends 830 of the first spring 83. The other end is prevented from rotating by the stop 820 that can be pivoted only by acting against the considerable force of the second spring 85. The rotation of the crank 80 is thus effected against the counter-winding force of the first spring 83. In this first phase, the intermediate piece 82 remains motionless.

The relative rotation of the crank 80 and of the intermediate piece 82 is blocked in the situation illustrated in FIG. 4 as soon as the second stop 802 on the crank 80 comes to rest against the inner sides 8211 of the driving stop 821 of the intermediate piece 82. From this point, as illustrated in FIG. 5, any rotation of the crank 80 can be effected only against the force of the second spring 85 of which one of the ends 850 is driven by the outer side 8210 of the stop 821, itself actuated by the stop 802. The first spring 83 stays in the same spread position. Since the force of the spring 85 is clearly greater than the force of the spring 83, a clear tactile reaction is perceived by the operator as soon as the point illustrated in FIG. 4 is overshot. The control panel 7 can accompany this reaction by generating an acoustic and/or optical signal when it detects that the crank 80 overshoots the position illustrated in FIG. 4. The stops 842 restrict the displacement of the second ends 850. As soon as an end reaches the stop 842, any displacement of the crank 80 in the same direction is prevented.

Figure 5:
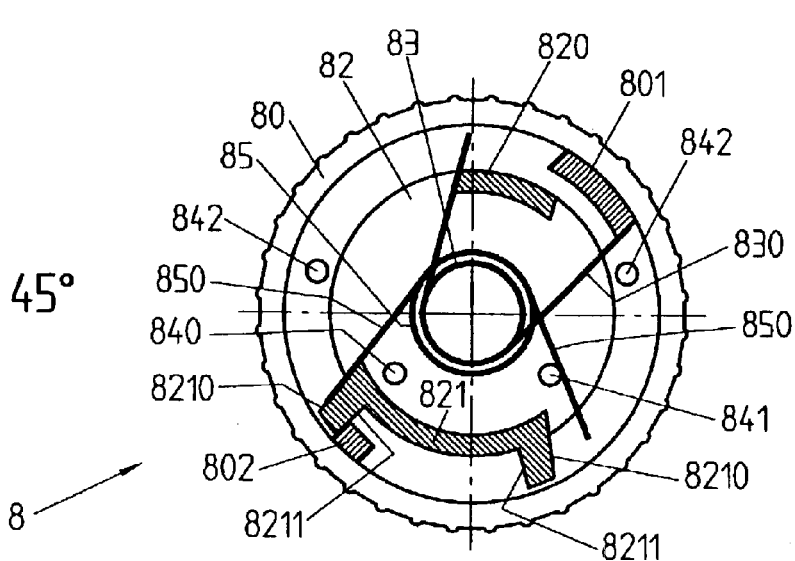
FIG. 5 shows a diagrammatic view of the main elements of the turning control button beyond the first predetermined angular position.

The illustrated FIGS. 3 to 5 represent the different components of a turning control button 8 when the control crank is rotated in clockwise direction. It will be immediately understood that a symmetrical behavior occurs during a rotation in the counter-clockwise direction. The restoring force in both directions of rotation being caused by the same two springs 83 and 85, the reactive torque exerted by the button 8 on the operator's hand is absolutely symmetrical.

In each direction of rotation, the turning control button 8 thus functions on two successive portions. In a first portion, for example of about 30°, the reactive torque exerted by the control button is determined by the first spring 83. In a preferred embodiment of the invention, the control panel 7 interprets a position of the control crank 80 in this first portion as an instruction of motorized displacement of the probe tip in the direction determined by the direction of rotation of the crank and whose speed depends preferably on the angle of rotation of the crank. The displacement of the probe tip is slowed and then stops when the crank 80 returns to its resting position. The display 70 displays the position of the probe tip 44 as soon as a contact is detected, i.e. when the probe tip comes to rest against the piece to be measured 9, or possibly continuously.

When the control crank overshoots the predetermined position illustrated in FIG. 4, the reactive force exerted by the button on the operator is determined by the second spring 85 and thus becomes considerably greater. The control panel 7 interprets an overshot over this position as a command to switch the measure mode. In a preferred embodiment, the carriage 3 then switches to automatic displacement mode and moves in the direction defined by the direction of rotation of the crank 80. The speed of automatic displacement is determined by the maximal amplitude of the overshot over the predetermined position. The probe tip 44 then moves until it comes into contact with a predetermined contact force with the piece to be measured 9 then performs the measurement and displays it. The measuring column 1 then reverts to the continuous display mode of the position of the probe tip 44.

The turning control button as described thus uses two distinct portions in each measurement rotation. It will be understood that it is possible to use more than two distinct portions in order to allow other measure modes to be entered by means of the button 8. For this purpose, it is possible to increase the number of intermediate driving pieces and of springs when it is wished that each threshold passing should correspond to a change of reactive torque exerted by the control button on the operator's hand.

It is also possible to devise other types of tactile reactions during the switch from one measure mode to another. In a variant embodiment of the invention, it would for example be possible to effect a localized reaction precisely at the point of measure-mode switch, without modifying the required torque for pivoting the measuring button beyond that point. This reaction could for example be caused by the elastic deformation of an element when the point of measure-mode switch is passed. It is also possible to generate actively a tactile reaction, for example by means of a motor acting on the axle of the turning control button.

In a preferred embodiment of the invention, the mode-switch commands can be entered by passing several times during an interval of limited duration through a predetermined angular position. It is thus possible to increase the number of different measure modes that can be selected by means of the turning control button without increasing the number of distinct thresholds, making the use of the column particularly ergonomic. In a preferred embodiment of the invention, the program executed by the control panel 7 switches to turn-back point search mode when the control button passes twice during a limited interval, for example a second, through the predetermined position illustrated in FIG. 4. This mode makes it possible to measure the highest or lowest point (depending on the direction of rotation of the control button 8) of a hole or rod. The piece to measure 9 or the measuring column 1 is displaced horizontally by the operator whereas the probe tip automatically moves whilst maintaining a constant resting pressure between the probe tip and the piece.

A program executed by the microprocessor in the control panel 7 determines the trajectory covered by the probe tip 44 in this mode. An extrema-computing algorithm automatically determines the vertical coordinate of the lowest point of this trajectory; an interpolation can possibly be carried out between the two closest extreme measurement points. A sound signal (beep) and/or optical signal is emitted as soon as the value of the extrema has been found. In order to obtain a more accurate measurement, it is also possible to scan several times in succession, in the opposite direction, the area around the turn-back point. In this case, the extrema measurement point is taken into account.

It can happen that an inexperienced or inattentive operator displaces the probe tip in the direction of the hole's lowest point, then returns back without reaching this point. In this case, the extrema will be constituted by the turn-back point, which here will be different from the hole's lowest point. In order to avoid incorrect measurements, the turn-back point measurement will preferably be validated only if the differential coefficient of the vertical position of the probe tip's trajectory is close to zero at the extrema.

As soon as the extrema has been found, the probe tip 44 is displaced so as to separate it from the work-piece 9 and the coordinate of the computed turn-back point is displayed on the display 70.

In order to measure the diameter and/or the coordinate of a hole's center, it is then possible to displace the probe tip 44 against the upper part of the hole and carry out again the same search operation to find the hole's upper extrema. The measuring and displaying system can be programmed to display either the center or the diameter of the hole.

The measuring column then reverts to the continuous display mode or, in a variant embodiment, switches to the search mode of the next extreme.

In the variant embodiments illustrated here above, only the angular position of the control button 8 is used to enter the mode-switch commands. It would however also be possible to effect other operations on this button, for example to push it, to enter additional commands without having to let go. It is also possible to enter different measure-mode switches by passing the same angular position by pushing the button.

It will further be understood that the measure modes corresponding to the different use portions of the crank 80 and the measure-mode switches entered by passing through predetermined angular positions can be modified by acting on the software executed in the control panel 7. Different measure modes can thus be defined by modifying this software or, without replacing it, by entering appropriate programming commands by means of the keys 71.

The one skilled in the art will further understand that the invention described can also apply to non-motorized measuring columns, in which the carriage carrying the probe tip 44 is displaced directly by a manual crank. The angular position of this manual crank can be measured to generate instructions to switch the measure mode when predetermined thresholds are passed.

What is claimed is:

1. A dimension-measuring column, comprising:
    a probe tip designed for being brought into contact with the piece to be measured,
    a device for driving said probe tip,
    a control panel for displaying the position of said probe tip and for controlling said driving device,
    a turning control button for driving said probe tip in a first direction when said button is turned in clockwise direction and in the opposite direction when said button is turned in counter-clockwise direction,
    wherein said turning control button enables additional mode-switch commands to be entered by making it pivot beyond at least one predetermined threshold.

2. The dimension-measuring column of claim 1, wherein said control panel is provided with several keys, whereas mode-switch commands can be entered either by acting on the angular position of said turning control button or by acting on said keys of said control panel.

3. The dimension-measuring column of claim 1, wherein a tactile reaction is effected by said turning control button on the operator each time said turning control button passes through one of said predetermined thresholds.

4. The dimension-measuring column of claim 3, wherein the torque necessary for pivoting said turning control button varies suddenly when said turning control button passes through one of said predetermined thresholds.

5. The dimension-measuring column of claim 4, wherein a sound and/or optical signal is emitted when the measure mode is switched.

6. The dimension-measuring column of claim 4, wherein said turning control button comprises at least one spring for bringing said turning control button back in a predetermining resting position.

7. The dimension-measuring column of claim 6, wherein said turning control button comprises at least two springs for bringing said turning control button in a predetermined resting position with a first torque when the angular position of said control button is situated in a first interval around said resting position, and with a second, greater torque when the angular position of said control button is situated in a second interval around said resting position.

8. The dimension-measuring column of claim 7, wherein said turning measuring button comprises a crank designed to be held by the operator, an intermediate driving piece, a first spring for bringing back said crank in a predetermined position relative to said intermediate driving piece, and a second spring for bringing back said intermediate driving piece in a resting position relative to said measuring column, the torque of said springs being different from one another.

9. The dimension-measuring column of claim 8, wherein said at least one spring enables said turning control button to be brought back in said resting position whatever the direction in which it has pivoted.

10. The dimension-measuring column of claim 9, wherein the angular position of said turning control button between said predetermined thresholds determines the displacement speed of said probe tip.

11. The dimension-measuring column of claim 1, wherein said mode-switch command allows said column to switch to an automatic displacement mode in which said probe tip moves automatically until it comes into contact with the piece to be measured, then displays the measurement corresponding to the contact point.

12. The dimension-measuring column of claim 11, wherein the displacement speed of said probe tip in said automatic displacement mode depends on the angular position reached by said turning control button.

13. The dimension-measuring column of claim 11, wherein the direction of automatic displacement depends on the angular position of said turning control button relative to said resting position.

14. Measuring column according to claim 11, characterized in that it can be switched into an automatic displacement mode by acting on said angular position.

15. The dimension-measuring column of claim 1, wherein said mode-switch command allows said column to switch to a search mode of a turn-back point of a piece to be measured.

16. The dimension-measuring column of claim 1, a different mode-switch commands being entered when said turning control button passes twice through the same threshold during an interval of predetermined duration.

17. The dimension-measuring column of claim 10, wherein said mode-switch command allows said column to switch to a search mode of a turn-back point of the piece to be measured when said turning control button passes twice through the same threshold during an interval of predetermined duration.

18. The dimension-measuring column of claim 1, the measure mode selected by passing through one of said predetermined thresholds being determined by a computer program.

19. The dimension-measuring column of claim 1, comprising a potentiometer and an electric circuit for determining the angular position of said turning control button, a computer program enabling said mode-switch command to be executed according to the signal supplied by said electric circuit.

20. The dimension-measuring column of claim 1, wherein a tactile reaction is effected by said turning control button (8) on the operator each time said turning control button passes through said predetermined threshold.

21. A method of selecting a measure mode of a dimension-measuring column provided with a probe tip, comprising a step of driving said probe tip in a first direction if a button is turned clockwise, a step of driving said probe tip in an second direction opposite to said first direction if said button is turned counter-clockwise, and a step of switching said measure mode if said button is pivoted beyond at least one predetermined threshold.

22. The method of claim 21, wherein a tactile reaction is perceived when said turning control button passes through said threshold.

23. The method of claim 22, wherein the torque necessary for turning said turning control button varies when said turning control button passes through said threshold.

24. The method of claim 21, wherein a sound and/or an optical signal is emitted when the measure mode.

25. The method of claim 21, wherein said turning control button automatically returns in a resting position when released.

26. The method of claim 25, wherein the torque necessary for maintaining said turning control button in a position different from said resting position increases when this position moves away from said resting position.

27. The method of claim 21, wherein said modeswitch command allows said measuring column to switch to an automatic displacement mode of the probe tip until it comes into contact with the piece to be measured, then displays the measurement of the contact point.

28. The method of claim 21, wherein additional mode-switch commands can be entered by having said turning control button (8) pass twice through the same predetermined angular position during an interval of predetermined duration.

29. The method of claim 21, wherein a mode-switch command entered by said turning control button allows said measuring column to switch to a search mode of a turn-back point of a piece to be measured.

30. The method of claim 21, wherein the angular position of said turning control button is determined by means of a potentiometer, an electric circuit enabling the resistance of said potentiometer to be determined, a computer program enabling said modeswitch command to be executed according to the signal supplied by said electric circuit.

31. The method of claim 30, wherein the measure mode determined by acting on said turning control button is programmed.

32. The method of claim 21, wherein the displacement speed of said probe tip depends from said angular position.

33. A method enabling a command to switch the measure mode to be entered in a dimension-measuring column provided with a probe tip, wherein said command to switch the measure mode is entered by acting on the angular position of a turning control button, wherein additional mode-switch commands can be entered by having said turning control button pass twice through the same predetermined angular position during an interval of predetermined duration.

* * * * *